United States Patent Office 3,669,564
Patented June 13, 1972

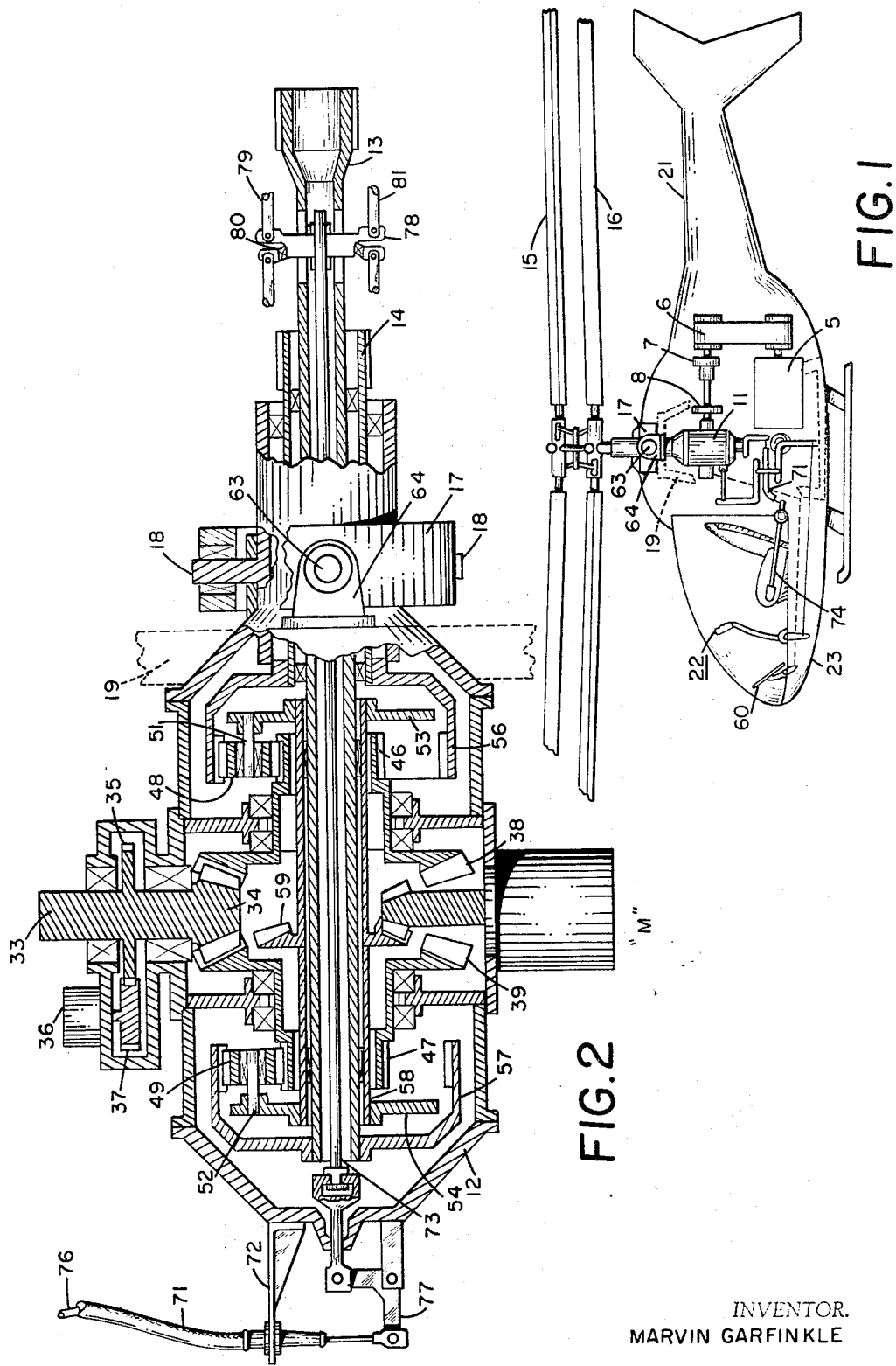

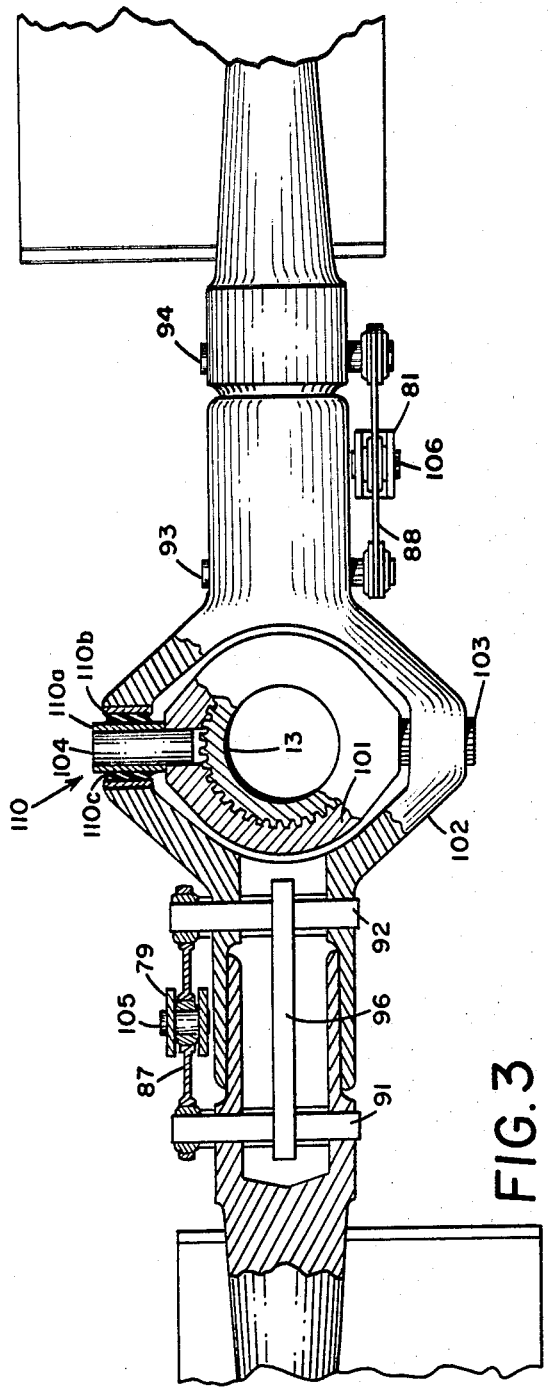

3,669,564
COAXIAL HELICOPTER ROTOR SYSTEM AND TRANSMISSION THEREFOR
Marvin Garfinkle, Cleveland, Ohio, assignor to Helicorporation, Philadelphia, Pa.
Filed Mar. 26, 1970, Ser. No. 22,898
Int. Cl. B64c 27/10
U.S. Cl. 416—121      9 Claims

ABSTRACT OF THE DISCLOSURE

Disclosed is a helicopter control system having a unitized rotor and transmission assembly for a craft using coaxial counter-rotating rotors. The assembly is gimbal mounted so that the transmission achieves directional control without altering blade pitch and the rotor head is of simplified construction to achieve collective control of the blades.

---

This invention relates to rotary winged aircraft and is directed particularly toward improvements in helicopter transmission and rotor systems, and related craft guidance systems, especially for those crafts employing coaxial counter-rotating lifting rotors.

Although many different arrangements of lifting rotors have been developed, the ones which have received practical applications are principally three: dual rotors placed in tandem; a single main lifting rotor with an anti-torque vertically disposed rotor; and two counter-rotating lifting rotors coaxially mounted and being of the type that is shown herein as the helicopter employing the preferred embodiment of my invention.

In coaxial counter-rotating systems, two rotors turning at the same speed in opposite directions are positioned some distance apart on concentric shafts. Because power is equally distributed between the rotors, no net torque reaction is passed to the fuselage of the aircraft and consequently no tail rotor is required for providing yaw control which in a single main rotor craft is provided by varying the pitch of the tail rotor's blades.

Presently yaw control in the coaxial counter-rotating rotor system is achieved by unbalancing the power distribution between the rotors by increasing the pitch of the blades of one rotor with respect to the other. Because torque is essentially balanced except when purposely unbalanced, less coordination is required for control of the craft on the part of the pilot than is required in craft having a single main rotor. On the other hand, the dual rotor system, because it requires the same collective and cyclic pitch control as does single main rotor machines, has led to far more complicated and costly mechanical systems to achieve the necessary control. In addition, since no anti-torque rotor is provided, the mechanical control system must be further complicated by a torque unbalancing linkage between the rotors.

The improvements of the present invention include, providing a coaxial counter-rotating system, a novel transmission, a novel rotor head assembly, a new mounting for the transmission and rotor head, and an improved and simplified control linkage for the craft. In addition, there is provided a gimbal mounting for the rotors which employs a differential transmission which maintains equal torque between the rotors of the coaxial rotor helicopter.

The gimbal mounting structure permits tilting of the drive transmission to provide for directional control or its aerodynamic equivalent while simplifying the structure for collective control.

The transmission and rotor head system in accordance with the present invention provides an improved yaw control by unbalancing the torque between the rotors in accordance with my improved differential transmission structure.

In the rotor system the rotor disc is maintained essentially normal to the axis of rotation in which flapping is aerodynamically suppressed. It will be found that the assembly illustrated by my preferred embodiment is aerodynamically sound and has the advantages of two counter-rotating lifting rotors and yet is mechanically simplified so as to permit substantial cost reductions in manufacture.

It is the prime object of the present invention to provide an improved helicopter transmission and coaxial rotor system in which the pitch variations of the blades are controlled by a mechanism formed as part of the transmission to afford a simplified coaxial rotor arrangement.

It is a more particular object of the present invention to provide a gimbal-mounted differential transmission to maintain equal torque between the rotors of a coaxial rotor helicopter.

It is still another object of the present invention to provide propulsion of a coaxial rotor helicopter by tilting the entire transmission and rotor shafts in the desired direction of travel about their gimbal-mount.

It is another object of the present invention to establish yaw control by unbalancing the torque between the rotors by biasing the differential transmission.

It is still another object of the present invention to provide a rotor system in which the rotor disc is maintained essentially normal to the axis of rotation with blade flapping being aerodynamically suppressed.

An aspect of the present invention resides in the provision of a rotary winged aircraft in which a pair of coaxial rotors are adapted to be driven in opposite directions and are connected to power means including a transmission for driving the rotors in opposite directions. The transmission includes two epicyclic gearing mechanisms with one gearing mechanism being connected to one rotor and the other gearing mechanism being connected to the other rotor. A flexible input to the transmission is provided to permit tilting movement of the transmission about the rotor axis. A gimbal is arranged to mount the transmission and the rotors on the fuselage of the aircraft. A restraining mechanism is located concentrically between the two eipcyclic gearing arrangements to effect torque equalization between the rotors. A yaw control means is connected to the restraining means and is effective to affect the rate of rotation of each rotor and, finally, a lift control is suitably arranged to collectively vary the position of the blade of the rotors in order to vary the lift of the rotors.

For a better understanding of the present invention, together with other and further objects thereof, reference is had to the following description taken in connection with the accompanying drawings, and its scope will be pointed out in the appended claims.

In the drawing:

FIG. 1 is a schematic view of the helicopter rotor control system; and

FIG. 2 is a longitudinal cross-sectional view of the power transmission for the rotor system in accordance with the present invention; and FIG. 3 is a top view partially in section of the upper rotor head of the coaxial rotor system in accordance with the present invention; and FIG. 4 shows a side view of the upper rotor head of FIG. 3 also partially in section.

It will be understood that in combination, the rotor system and the transmission thereof, includes a coaxial rotor transmission, generally indicated by numeral 11 having a transmission housing 12 and an inner 13 and an outer 14 rotor shaft, counter-rotating rotors including an upper rotor 15 and a lower rotor 16 mounted so as to permit movement in opposite directions.

A gimbal ring device 17 is mounted and pivotally connected to transmission housing 12 in such a manner that the inner 13 and outer 14 rotor shafts are concentric with the gimbal ring device. The housing 12 extends integral pivot pins 18 into the gimbal ring and, in turn, the gimbal is secured to the fuselage 19 of the helicopter 21 by a gimbal support bracket 64 so that the transmission and the rotor system are suspended from the gimbal ring 17.

A directional control lever 22 having a related linkage which will be later described is attached to the transmission housing and connected to effectively simultaneously tilt the transmission housing and both of the rotors about the gimbal in response to movement of the directional control lever 22 and the consequent actuation of the control linkage.

Turning now to the more detailed concepts of my invention, we may refer to the drawing, such as the transmission structure particularly in FIG. 2. The helicopter engine 5 provides power through belt drive 6 to the transmission. Mounted within transmission housing 12 is a gear train comprising a power input shaft 33 having at one end a spur gear and bevel pinion 34 drivingly connected to an upper bevel gear 38 and to a lower bevel gear 39, both journaled in said housing for rotation about the rotor shaft axis.

It will be noted that as bevel gears 38 and 39 rotate, they become the prime movers for an upper and a lower epicyclic gear system. The upper system is provided with an upper sun gear 46 and the lower epicyclic gear system is provided with a lower sun gear 47, both driving corresponding upper 48 and lower 49 planet gears. Additional planet gears can be provided as is necessary to transmit the required load.

The upper and lower planet gears are journaled on support shafts 51 and 52 respectively. The other ends of the shaft for each gear is secured in a corresponding upper 53 or lower 54 planet carrier. As will be mentioned later each carrier is connected to the other by way of a differential shaft 58.

The outer rotor shaft 14 is driven by the upper ring gear 56 meshing with upper planet gear 48. Correspondingly, the inner concentric rotor shaft 13 is connected to the upper rotor 15 and to the lower ring gear 57, which in turn is driven by the lower planet gear 49. Accordingly, the transmission will drive the upper and lower rotors in the opposite directions.

It will be noted that load differences normally occur between rotor shafts. It is known that advancing and retreating blades have different aerodynamic forces acting on them, and when two rotors are oppositely driven this causes differences in the torque requirements of each rotor. The differential shaft 58 interconnecting the upper and lower planet carriers equalizes the torque requirements and prevents relative rotation between the carriers, while, nevertheless being free to rotate about its shaft axis. This is important for achieving yaw control in accordance with the invention.

To control yaw, the differential shaft 58 is connected through a drive linkage 59 to a yaw control motor M. The linkage is so placed so as to be insensitive to torsion applied to differential shaft 58. The motor may be a conventional electric or hydraulic torque motor and it is permitted normally to turn freely with the differential shaft 58. The motor is powered by a suitable electrical or hydraulic circuit which is actuated or connected by conventional switches or valves located in the pilot's compartment. Power is supplied to the circuit by a generator or pump 36 which is rotated by the toothed (35) input shaft 33 through gear 37. Foot pedals 60 can be employed, so that selective actuation of the motor will cause it, and its planet carriers to turn at a speed and in a direction such that the rotors transmit torque to the transmission mounting to cause the craft to swing about the vertical axis.

Movement of the craft forward or to the rear is controlled by changing the inclination of the rotor discs. When the control lever 22 is pushed forward the craft will be caused to roll forward, and when the lever is pulled back the craft will roll backwards. This movement can be achieved without the conventional cyclic control which provides the directional control by individually varying the pitch of the individual blades. This action is permitted because of the mounting of the transmission and rotor assembly on the gimbal ring 17 which in turn is pivotably mounted on the fuselage 19, by bracket 64 in which a gimbal shaft 63 is journaled, so that the entire assembly can be tilted in the desired direction by means of a simple cable push-pull linkage. Torque transmitted through the gimbal shafts 18 and 63 is effective in yaw control.

The gimbal mounting has its cable connected to the directional control lever by a coaxial arrangement as illustrated in FIG. 2 in which the pitch or collective control cable 71 is connected to support bracket 72 mounted on the transmission housing. The movement of the transmission and rotor assembly as a unit, and the operation thereof, is facilitated by universal joints 7 and 8 which transmit power to the unit despite various angular displacements which are effected by the directional control lever. The gimbal ring itself is accordingly designed to transmit the machine weight, the torque load of the engine, and the yaw movement applied to the transmission by the torque motor.

Since forward and rearward propulsion is supplied by tilting the transmission housing, and yaw is supplied by the actuation of the torque motor, the conventionally complicated linkage required for individual cyclic control of the pitch of the blades is avoided.

Accordingly, also, only lift need be controlled through the rotor head in the present invention. There is provided a simplified linkage for achieving collective pitch of the rotor blades in response to movement of control lift rod 73.

Movement of the collective pitch control lever 74 in the cockpit moves the core lift cable 76 and bell crank 77 to raise and lower the lift rod 73 which is centrally positioned to pass through the center of the concentric rotor shafts 13 and 14. Connected to the upper end of the lift rod between the upper and lower rotors is a yoke 78 to which are attached four pitch control rods. The lower pitch control rods are free to rotate relative to the upper pitch control rods because the lower portion of the yoke is journaled in bearings 80 on the underside of the yoke. Otherwise, the yoke causes axial movement of the pitch control rods in the same direction as that of the lift rod 73.

While the upper set and lower set of pitch control rods rotate with their rotors in opposite directions, the mounting of the pitch control rods and the other related structure is similar and there is only illustrated the upper rotor pitch control mounting. It will be understood that a corresponding, yet mirror movement will be found for the lower rotor.

The rotor head has a cap member 101 splined to the upper end of the inner rotor shaft 13. The upper rotor head 102 is mounted on trunnions consisting of shafts 103 and 104, each of which is journaled at one end in the cap member 101 and at the other end to the head 102 in an elastomeric bushing 110, such that flapping of the head relative to the cap is freely permitted such that blade vibrations are isolated from the rotor shaft. For this purpose, the bushing 110 is of the torque resisting type comprising an inner 110a and an outer 110b metal sleeve with a rubber-like annulus 110c sandwiched under radial pressure therebetween. The annulus 110c is securely bonded to the sleeves so that any relative rotary motion between the sleeves is resisted by the rubber-like member.

Unrestrained flapping of the rotor blades, in the seesaw fashion, serves no aerodynamic function, and flapping is only permitted to the extent that it relieves the bending moments of the blades at the blade roots arising from asymmetrical loading during rotation. Accordingly, and relative to the effect of the movement of the pitch control linkage, I have provided a structure which causes blade pitch to change in a direction to oppose flapping when flapping occurs, thus tending to restore the rotor disc to a position normal to the axis of rotation. This motion is facilitated by the blades being connected to the rotor shaft by the trunnion pins 103 and 104. The blade roots are connected to the head by pins 91 and 92 for the left blade, via interconnecting torsion bar 96, and corresponding right blade pins 93 and 94 connected by right hand torsion bar (not shown). This connection causes the pins to move in the same direction as their respective blades stroked. Since the pitch of the blade is controlled by the movement of the pitch rods 79 and 81, as discussed below, movement of the pitch rods changes blade pitch. But with the linkages stationary, the cross arms will pivot about the cross-arm connecting bearings 105 and 106 and this will cause the outer of the blade connecting pins for each blade to rotate and this will change the blade pitch, the change will be in a direction to oppose flapping.

This change in pitch can be accomplished because each blade is rotatably secured in the mating socket of the rotor head, but rotation is normally prevented by virtue of the pins 91, 92, 93 and 94, interconnected by a torsion bar (for instance 96). This linkage is such that upward movement of the pitch rods 79 and 81 will cause the cross arms 87 and 88 to pivot about the respective connecting pins, causing an upward movement of the outer pins attached to the blade roots (movement of the inner pins is prevented by the rotor head connection to the rotor shaft) and thereby cause an increased pitch in the rotor blades, increasing lift.

A corresponding downward movement of the pitch rods will cause a decrease in lift. When linkage movement and flapping occur simultaneously, their effect on blade pitch is essentially additive and the same structure has the dual function of effecting collective rotor pitch control and flapping restraint.

While there have been described what are at present considered to be the preferred embodiments of this invention, it will be obvious to those skilled in the art that various changes and modifications may be made therein without departing from the invention, and it is aimed, therefore, in the appended claims to cover all such changes and modifications as fall within the true spirit and scope of the invention.

What is claimed is:

1. In a rotary winged aircraft, a pair of rotors having a common axis and being adapted to be driven in opposite directions and being connected to power means including a transmission for driving said rotors in opposite directions, said transmission having two epicyclic gearing means with one gearing means being connected to one rotor and the other gearing means to the other rotor, a flexible power input to said transmission adapted to permit tilting movement of said transmission about said axis, gimbal means for mounting said transmission and said rotors on the fuselage of said aircraft while permitting said tilting movement of said transmission, restraining means located concentrically between said two epicyclic gearing means for torque equalization between said rotors, yaw control means connected to said restraining means, and effective to affect the rate of rotation of each rotor, and lift control means operable to collectively vary the pitch of the blade of said rotors to vary the lift of said rotors.

2. A rotary winged aircraft according to claim 1 wherein said transmission comprises in combination: power input means including a gearing mechanism located within said housing; identical upper and lower epicyclic gear systems spaced relative to each other and disposed in operable relationship to said first mentioned gearing mechanism; a planet carrier connecting to said upper epicyclic gear system and a planet carrier connected to said lower epicyclic gear system for supporting the same; an inner and an outer rotor shaft, an upper and a lower ring gear, one thereof connecting to the inner rotor shaft and the other connecting to the outer rotor shaft; and a rotatably disposed differential shaft connecting to and supporting said planet carriers and effective to prevent relative rotation therebetween, said differential shaft being effective to rotate in response to transient load differences to establish torque equalization between the rotor shafts or, alternatively, effective for unbalancing the rotor shafts in response to motorized actuation of said differential shaft.

3. A rotary winged aircraft according to claim 1, and power means in engagement with a differential shaft of said transmission to effect torque control and in response to manual actuation of the power means to transmit the torque through a transmission support shaft to said gimbal means to establish yaw control.

4. A rotary winged aircraft according to claim 1, wherein one rotor connects to an inner rotor shaft and said lift control means includes rod means extending coaxially within said inner rotor shaft, with one first axial end of said rod extending between the counter-rotating rotors; manually operable pitch control linkage means including a flexible member attaching to the opposite axial end of said rod; and a plurality of control linkages attached to said first end of said rod connecting the rod to each of the two rotors.

5. A rotary guidance control system according to claim 1, wherein said differential shaft is affected by motorized means to cause yaw control.

6. A coaxial helicopter rotor system and transmission according to claim 1, said transmission being constructed and arranged to rotate said rotors independent of said yaw control means.

7. A rotary winged aircraft according to claim 1, and directional control linkage means attached to said transmission and effective to tlit both of said rotors about said gimbal relative to the fuselage in response to actuation of said linkage means.

8. A rotor pitch control assembly comprising a rotor head, a pair of rotor blades, mounting means for mounting said blades on said head in substantial axial alignment including for each blade a socket in said head adapted to receive a mating root of said blade while permitting free rotation of said blade about its axis, a first pin through said socket, a second pin through said root, and a torsion bar interconnecting each of said pins, a cross arm for each blade connecting at opposite ends to said head and the corresponding root extending parallel to said torsion bar, a pitch control linkage connected to said cross arm including a lift rod connected at one end to said cross arm for each blade at a location intermediate to said opposite ends between said pins and at its other end to a yoke interconnecting said lift rod for each blade with the other lift rods of said assembly, said yoke being adapted to move axially solely in the direction of the axis of said lift rods wherein said rotor head is connected to a drive shaft for said rotor by a trunnion mounting including bushing means effective to reduce vibration transmitted from said head to said shaft.

9. A rotor pitch control assembly according to claim 8, wherein said bushing means is formed of an elastomeric member.

(References on following page)

References Cited

UNITED STATES PATENTS

| | | | |
|---|---|---|---|
| 2,612,962 | 10/1952 | Lewis | 416—163 |
| 2,658,575 | 11/1953 | Stone | 416—121 |
| 2,995,192 | 8/1961 | Scheutzow | 416—114 |
| 2,997,110 | 8/1961 | Adler | 416—168 |
| 3,018,984 | 1/1962 | Le Beau Rust | 244—17.19 |
| 3,254,724 | 6/1966 | Brooke | 416—148 |
| 3,450,208 | 6/1969 | Barton | 416—129 |

FOREIGN PATENTS

| | | | |
|---|---|---|---|
| 50,425 | 6/1940 | France | 416—128 |

MARTIN P. SCHWADRON, Primary Examiner

C. F. SCHIMIKOWSKI, Assistant Examiner

U.S. Cl. X.R.

244—17.19; 416—129, 148, 168, 170